Figure 1:
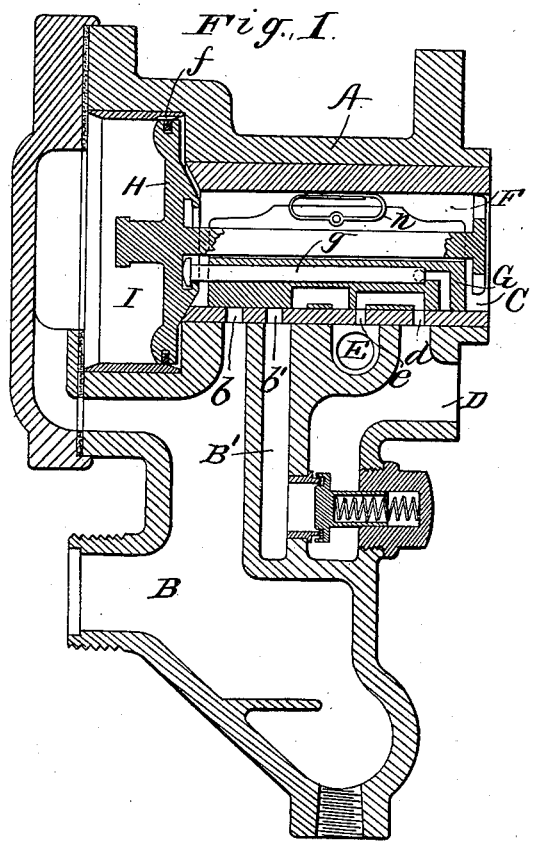

No. 630,379. Patented Aug. 8, 1899.
W. B. MANN.
TRIPLE VALVE FOR AIR BRAKES.
(Application filed Oct. 19, 1898.)
(No Model.) 2 Sheets—Sheet 1.

Witnesses.
H. R. Edelin.

Inventor
William B. Mann
by
his attorneys

No. 630,379. Patented Aug. 8, 1899.
W. B. MANN.
TRIPLE VALVE FOR AIR BRAKES.
(Application filed Oct. 19, 1898.)
(No Model.) 2 Sheets—Sheet 2.
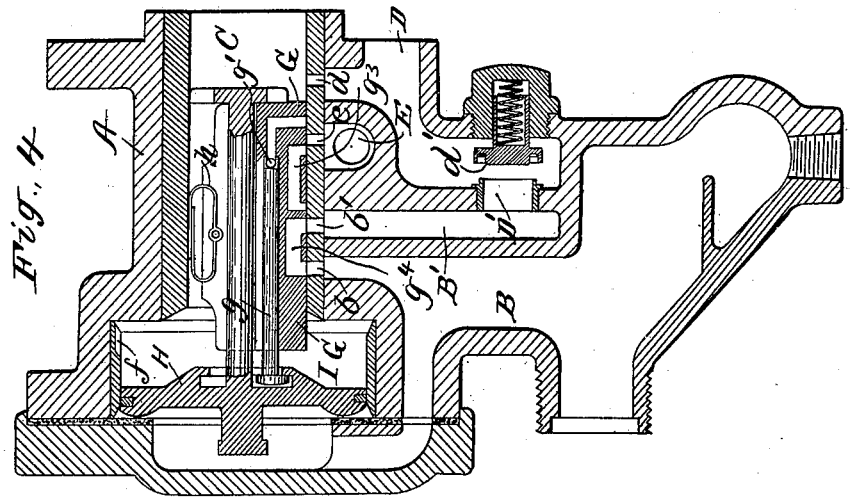
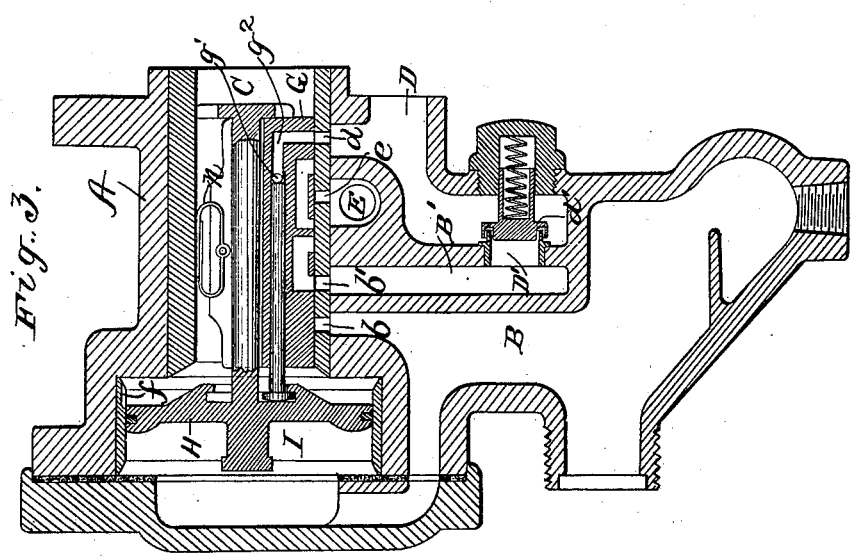
Witnesses.
W. R. Edelen.
Inventor
William B. Mann
by Louis Mauro
his attorney

UNITED STATES PATENT OFFICE.

WILLIAM B. MANN, OF BALTIMORE, MARYLAND.

TRIPLE VALVE FOR AIR-BRAKES.

SPECIFICATION forming part of Letters Patent No. 630,379, dated August 8, 1899.

Application filed October 19, 1898. Serial No. 694,001. (No model.)

*To all whom it may concern:*

Be it known that I, WILLIAM B. MANN, a resident of Baltimore, Maryland, have invented a new and useful Improvement in Triple Valves for Air-Brakes, which invention is fully set forth in the following specification.

My invention relates to triple valves for controlling the operation of air-brakes on railway-trains, and more particularly to that class of triple valves known as "quick-action" valves, wherein provision is made for graduated application of the brakes in service stops and a quicker and more powerful application of the brakes in an emergency.

In the system now generally in use the triple valve is controlled in its movements by a piston exposed on one side to train-pipe pressure and on the other side to pressure in the auxiliary reservoir. By a slight reduction of train-pipe pressure said piston is caused to make a partial traverse of the length of its cylinder, thereby shifting the triple valve so as to permit a moderate air-pressure to enter the brake-cylinder for a service stop, and by a considerable reduction of train-pipe pressure said piston is caused to traverse the full length of its cylinder and thereby shift the triple valve into position to permit a powerful air-pressure to suddenly enter the brake-cylinder and apply the brakes with great force for an emergency stop. The necessary reduction in train-pipe pressure for a service stop is secured by permitting a small amount of air to escape from the train-pipe at the engineer's valve; but to secure the necessary promptness of action in all the triple valves of a long train for an emergency stop it has been found necessary to vent the train-pipe at a number of points along the train and preferably under each car. In some cases the air thus vented from the train-pipe in making an emergency stop is conducted to the brake-cylinder, and it is to the class of triple valves thus operating that my invention particularly relates. Heretofore in structures which vented the train-pipe to the brake-cylinder for an emergency application of the brakes dependence has been placed in springs to operate with the valve controlling the vent-port or to operate or assist in operating the triple valve itself. This is objectionable for the reason that the tension of such springs has to be adjusted according to the air-pressure normally carried in the train-pipe, and if for any reason such pressure is altered—as, for example, when the air-pump fails to operate effectively—the tension of the springs is not such as to comply with the changed conditions. A further objection to most of the triple valves operating to vent the train-pipe to the brake-cylinder is that they require a greatly-increased number of parts over the old form of triple valve, thus multiplying the chances of getting out of order and consequent failure to operate properly at a critical moment.

The objects of my invention are to provide a triple valve which shall not only perform all the functions of an ordinary triple valve in controlling the flow of air to the auxiliary reservoir and from the latter to the brake-cylinder in service and emergency stops, but which shall also control the ports between the train-pipe and the brake-cylinder, and which shall in all its movements depend entirely upon air-pressure in the train-pipe and auxiliary reservoir without the interposition of any spring or springs.

A further object of the invention is to simplify the construction of such valves, and thereby reduce their liability to get out of order.

With these objects in view the invention consists of a valve-casing having the usual ports leading to the train-pipe, the auxiliary reservoir, and the brake-cylinder, within which casing is placed a slide-valve controlling ports between the auxiliary reservoir and the brake-cylinder, the train-pipe, and the brake-cylinder and between the brake-cylinder and the atmosphere, said slide-valve being actuated by a piston whose movements are due to and are entirely controlled by air-pressure either in the train-pipe or the auxiliary reservoir.

The invention may assume various forms, one of which I have illustrated in the drawings forming part of this specification, in which—

Figure 2:
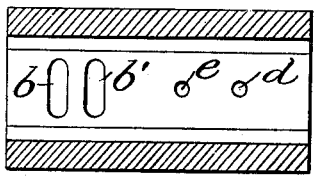

Figure 1 is a vertical sectional view, parts being shown in elevation, of my improved triple valve, showing the parts in release position. Fig. 2 is a plan of the bottom of the valve-casing, showing the ports leading therefrom. Fig. 3 is a view similar to Fig. 1, with the parts in position for making a graduated or service application of the brakes; and Fig. 4 is a similar view with the parts in position for making an emergency application thereof.

Like letters refer to like parts in all the views, in which—

A is the valve-casing.

B is the passage leading to the train-pipe; C, the passage to the auxiliary reservoir; D, that to the brake-cylinder, and E a passage to the atmosphere.

In the valve-chamber F are four ports—viz., $b$, leading to the train-pipe passage B; $b'$, to a passage B'; $d$, to the brake-cylinder passage D, and $e$ to the exhaust-passage E. Within the valve-chamber F is a single valve G, arranged to move over and control the passage of air through said ports $b$, $b'$, $d$, and $e$, said valve G being actuated by a piston H, moving in a cylinder I, forming an end extension of the chamber F, which piston has a piston-rod $h$, having lost-motion connection with the valve G. Attached to said piston H is a graduating-valve $g$, controlling a port $g'$, connecting a duct $g^2$ in the valve G with the valve-chamber F. Besides the duct $g^2$ there are two other ducts $g^3$ and $g^4$ formed in the valve G. One of these ducts $g^3$ is of a proper length to connect the port $d$ with the port $e$ when the parts are in release position, as shown in Fig. 1, and the other duct $g^4$ is of a proper length to connect the ports $b$ $b'$ when the parts are in emergency position. (Shown in Fig. 4.) It will be observed that the duct $g^2$ has no communication with the valve-chamber F, and hence none with the auxiliary reservoir, except through port $g'$, and that both of the ducts $g^3$ and $g^4$ are at all times entirely shut off from the auxiliary reservoir. It will also be noted that when the ports $d$ and $e$ are connected by duct $g^3$ ports $b$ $b'$ are both closed by the face of the valve G, (see Fig. 1,) and that when the port $d$ is connected to the duct $g^2$ ports $b$, $b'$, and $e$ are closed—that is, are cut off from each other—as shown in Fig. 3. When the parts take the position shown in Fig. 4, however, the duct $g^4$ connects ports $b$ $b'$, and the port $d$ is opened to permit the passage of air from the auxiliary reservoir to the brake-cylinder. The passage B' is connected to the passage D through a port D', controlled by a spring-pressed check-valve $d'$, opening from the passage B' toward or into the passage D.

The operation is as follows: When it is desired to charge the auxiliary reservoir, air is admitted at the engineer's valve into the train-pipe and passes through passage B into cylinder I, forcing piston H into the position shown in Fig. 1, thereby uncovering feed-in port $f$, through which the air passes into the valve-chamber F and thence to the auxiliary reservoir by way of passage C. The brake-cylinder is exhausted to the atmosphere through passage D, port $d$, duct $g^3$, port $e$, and passage E, and passage B' is likewise exhausted because of its connection with passage D through port D', the valve $d'$ readily yielding to light pressure to allow any pressure in B' to escape to D. As heretofore remarked, ports $b$ $b'$ are closed by the valve G, and there is therefore no communication between passages B and B'. The parts will therefore remain stationary in the position shown in Fig. 1, the air continuing to pass from the train-pipe to the auxiliary reservoir through feed-in port $f$ until equilibrium of pressure is established in the two. As long as this equilibrium is maintained the piston H will not move, the parts being held against accidental displacement by the light spring $n$, having bearing on the valve G and the valve-casing F, as shown. When it is desired to moderately apply the brakes, either for checking the train on downgrades or for making an ordinary service stop, the engineer reduces the pressure in the train-pipe one or two pounds by allowing a proper amount of air to escape at the engineer's valve, whereupon the preponderance of pressure on the piston H is on the auxiliary-reservoir side, and this causes the piston to shift from the position shown in Fig. 1 to that shown in Fig. 2—that is, to traverse a part only of the length of its cylinder. In so doing it increases the area of the space occupied by auxiliary-reservoir air and decreases the space occupied by train-pipe air, and this is sufficient to establish an equilibrium of pressure on the two sides of the piston and bring it to rest in the position shown in Fig. 3. This movement of the piston H has served, first, to uncover port $g'$ by withdrawing graduating-valve $g$, which, owing to the lost motion between the piston H and valve G, has a slight motion relative to said valve G, and, second, to shift valve G so as to cause duct $g^2$ to register with port $d$, thereby permitting air to pass through the restricted port $g'$, duct $g^2$, and port $d$ to the brake-cylinder. This escape of air from the auxiliary reservoir effects a small reduction of pressure therein and causes the piston to move slightly to the right of the position shown in Fig. 3, thereby closing the graduating-valve $g$ over the port $g'$, but not moving the main valve G. This prevents the further egress of air from the auxiliary reservoir to the brake-cylinder, but does not connect the exhaust-passage E with the brake-cylinder. If the engineer desires to further slightly increase the pressure in the brake-cylinder, he again reduces the train-pipe pressure very slightly, causing the piston to again take the position shown in Fig. 3 and reopen the graduating-valve $g$, which will operate as before. This operation may be repeated until the desired pressure is secured in the brake-cylinder.

Should an occasion arise for making an emergency application of the brakes, the engineer opens his valve, so as to cause a sudden reduction of ten or twelve pounds in the train-pipe pressure, thus destroying the equilibrium of pressure on the opposite sides of the piston H, the pressure on the auxiliary-reservoir side exceeding that on the train-pipe side by ten or twelve pounds per square inch. This causes the piston H to suddenly traverse the full length of its cylinder I from the position shown in Fig. 1 or that of Fig. 3 to the position shown in Fig. 4, wherein the exhaust-passage E is closed, the port $d$ is uncovered, thus opening communication between the auxiliary reservoir and the brake-cylinder, and the duct $g^4$ connects ports $b$ and $b'$, thereby connecting the train-pipe passage B with the brake-cylinder passage D through the passage B'. The ports $b$ $b'$ are much larger than port $d$, as will be seen by inspecting Fig. 2, and the air from the train-pipe therefore rushes through said ports on the way to the brake-cylinder much more rapidly than the auxiliary-reservoir air passes through the port $d$, thereby securing the rapid reduction in train-pipe pressure under each car, on which reduction the quick serial action of all the triple valves in a long train depends. By thus permitting the train-pipe air to reach the brake-cylinder in advance of any considerable pressure due to auxiliary-reservoir air the maximum amount of pressure from the train-pipe is secured and the time required for the serial action of all the triple valves is reduced to the minimum. It will of course be understood that when the pressure in the brake-cylinder reaches a degree tending to cause back pressure from the brake-cylinder passage D through passage B' to the train-pipe the check-valve $d'$ promptly closes and retains the air in the brake-cylinder. This is of peculiar importance when the train breaks in two and sole reliance must be had on the auxiliary-reservoir air for applying the brakes. When the brakes are applied either for service or emergency stops, they are released by a restoration of train-pipe pressure, which causes the parts to assume the position illustrated in Fig. 1.

It will thus be seen that with only two valves—the main valve G and the graduating-valve $g$—I secure all the functions of the ordinary triple valve, and in addition thereto I control with the same main valve G the passage of train-pipe air from the train-pipe to the brake-cylinder, and that both the main and the graduating valves are controlled in all their movements by the operating-piston H, which in turn is controlled solely by air-pressures in the train-pipe and the auxiliary reservoir. It will also be noted that the extreme simplicity of the device greatly reduces the liability to get out of order and makes it cheap to manufacture.

While the specific construction herein illustrated and described is the best with which I am familiar, it will be understood that the same inventive idea may find various mechanical expressions, and my claims are not intended to be limited to the particular form herein shown, but are designed to include such other forms as may fairly fall within their terms.

Having thus described my invention, what I claim is—

1. The combination of a train-pipe, auxiliary reservoir, brake-cylinder and a by-passage in communication with the brake-cylinder, with a triple-valve chamber in communication with the auxiliary reservoir, said chamber having ports opening to the brake-cylinder, to the atmosphere, to the by-passage and to the train-pipe, a valve having two independent ducts therein one of which communicates solely with the brake-cylinder port and the exhaust-port and the other communicating solely with the train-pipe and by-passage ports, and a piston operatively connected to but having motion independent of said valve, and a graduating-valve controlled by said piston.

2. The combination of the train-pipe, auxiliary reservoir, brake-cylinder and by-passage in communication with the brake-cylinder, with a valve-chamber having separate ports opening to the train-pipe, the by-passage, the atmosphere and the brake-cylinder, a valve having a duct communicating only with the train-pipe and the by-passage ports, a second duct communicating only with the atmosphere and the brake-cylinder ports and a third duct communicating solely with the auxiliary reservoir and the brake-cylinder and a graduating-valve controlling said third duct, substantially as described.

3. The combination of the train-pipe, auxiliary reservoir, brake-cylinder and by-passage in communication with the brake-cylinder, with a valve-chamber having separate ports opening to the train-pipe, the by-passage, the atmosphere and the brake-cylinder, a valve having a duct communicating only with the train-pipe and the by-passage ports, a second duct communicating only with the atmosphere and the brake-cylinder ports and a third duct communicating solely with the auxiliary reservoir and the brake-cylinder, a piston operatively connected with said valve and controlled solely by fluid-pressure and means operated by said piston and controlling said third duct, substantially as described.

4. The combination of the train-pipe, auxiliary reservoir, by-passage and brake-cylinder communicating with said passage, with a valve-chamber having separate ports opening to the train-pipe, the by-passage, the atmosphere and the brake-cylinder, a valve having three independent ducts, one communicating solely with the train-pipe and by-passage ports, a second connecting the brake-cylinder and the atmosphere-ports, and the third communicating with the auxiliary reservoir and the brake-cylinder port, a piston operatively connected to said valve to shift the same, and a graduating-valve also operated by said piston and controlling said third duct, substantially as described.

In testimony whereof I have signed this specification in the presence of two subscribing witnesses.

WILLIAM B. MANN.

Witnesses:
 REEVE LEWIS,
 PHILIP MAURO.